United States Patent [19]

Vaz Martins

[11] 4,015,177
[45] Mar. 29, 1977

[54] TAPE RECORDER
[76] Inventor: Filinto Vaz Martins, rue Coulon 2, 2000 Neuchatel, Switzerland
[22] Filed: Feb. 15, 1974
(Under Rule 47)
[21] Appl. No.: 442,787
[30] Foreign Application Priority Data
Feb. 23, 1973 Switzerland .............. 2627/73
[52] U.S. Cl. .................................... 318/7; 318/68
[51] Int. Cl.² ............................. G05B 11/06
[58] Field of Search ............... 318/6, 7, 68, 77, 85, 318/480

[56] References Cited
UNITED STATES PATENTS

| | | | |
|---|---|---|---|
| 3,130,357 | 4/1964 | Westlake et al. | 318/7 |
| 3,277,357 | 10/1966 | Willis | 318/480 X |
| 3,358,199 | 12/1967 | Jones, Jr. | 318/6 |
| 3,586,259 | 6/1971 | Richt | 318/7 X |
| 3,600,654 | 8/1971 | Yasutake | 318/7 |
| 3,606,201 | 9/1971 | Petusky | 318/7 X |
| 3,704,400 | 11/1972 | Goshima et al. | 318/6 |
| 3,704,401 | 11/1972 | Miller | 31/7 |
| 3,715,641 | 2/1973 | Mattes | 318/7 |
| 3,716,177 | 2/1973 | Leavitt | 318/7 X |
| 3,764,087 | 10/1973 | Paananen et al. | 318/6 X |

Primary Examiner—Robert K. Schaefer
Assistant Examiner—W. E. Duncanson, Jr.
Attorney, Agent, or Firm—Robert E. Burns; Emmanuel J. Lobato; Bruce L. Adams

[57] ABSTRACT

A tape recorder has two tape spools independently driven by two reversible electric motors. The tape passing from one spool to the other drives a tachometer wheel which provides a tape speed signal. This signal is compared with a reference value by a differential amplifier which provides control signals for differentially controlling the speeds of the motors to maintain the tape at a constant speed.

7 Claims, 6 Drawing Figures

TAPE RECORDER

The invention relates to tape recorders.

In order to drive the tape in a tape-recorder, the general procedure is to use a constant-speed motor driving a capstan, and a mobile pressure-pulley providing or not providing a drive according to whether or not it presses the tape against the capstan. In refined tape recorders, two separate motors are provided to drive the tape delivery and take-up spools in such a manner as to keep the tape taut and also to permit rapid motion. These tape-recorders therefore use three motors as well as a mechanical arrangement for movement of the pressure-pulley, and a braking arrangement provided either manually or by means of electromagnets. These mechanical arrangements are noisy and are subject to breakdowns. Alternatively, a single motor in conjunction with a gear and clutch mechanism may be used to carry out the three driving functions, but this arrangement is also complex and even noisier.

The above drawbacks apply not only to open-deck tape recorders, but also to cassette tape recorders.

An aim of the invention is to provide means for driving a tape in a tape recorder which avoids the mentioned disadvantages, and which enables reliable, regular and relatively silent drive of the tape to be obtained by means of two motors only.

According to the invention, there is provided a tape recorder comprising two hubs adapted to drive two tape spools to pass a tape from one spool to the other along a given path, two individual motors adapted to drive respective ones of said hubs, a tacheometric wheel disposed so as to be driven by a tape passing along said given path, at a speed proportional to the speed of the tape along said given path, means for providing an electrical signal representing the speed of rotation of the tacheometric wheel, and an electronic control circuit, said circuit including means for comparing said signal with a reference value and providing individual control signals for differentially controlling the speeds of the two motors to maintain the speed of the tape along said given path at a constant value.

The invention will now be described in detail, by way of example, with reference to the accompanying drawings, in which.

Figure 1:
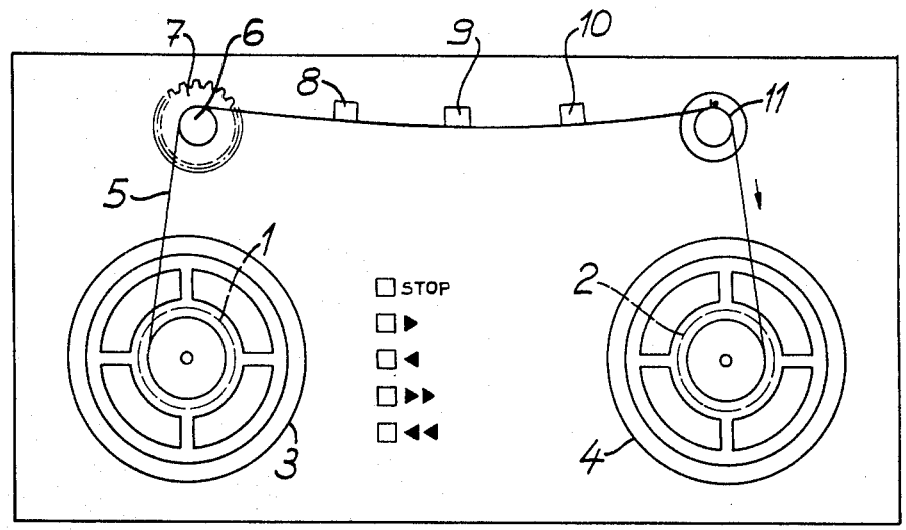
FIG. 1 is a diagrammatic plan view of a tape recorder.

The tape recorder shown in FIG. 1 comprises two individual reversible variable-speed electric motors 1 and 2 the shafts of which drive respective hubs on which two tape spools 3 and 4 are engaged. One of these spools, for example 3, delivers a magnetic tape 5 and the other, for example 4, takes up the tape, or vice versa.

Tape 5 from spool 3 passes over a pully 6, the shaft of which carries a tachometer wheel 7, past magnetic heads 8, 9 and 10, over a second pulley 11, and is taken up on spool 4. The magnetic heads 8, 9 and 10 and their associated circuits are of a known type, and for example carry out the functions of play-back, recording and erasure.

Figure 3:
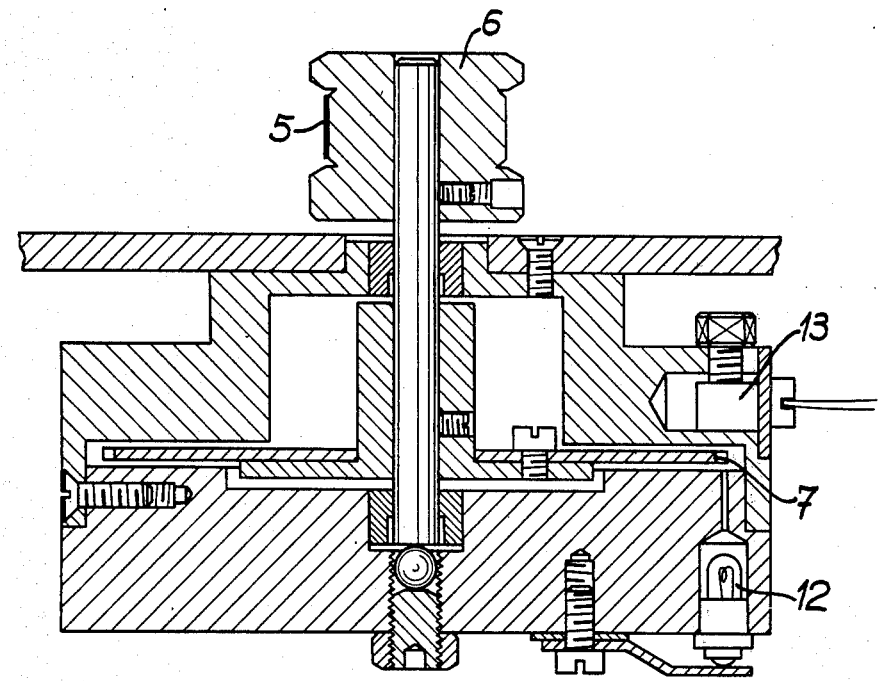
FIG. 3 is a cross-sectional view of a detail.

Pulley 6 and its tachometer wheel 7 are shown in section on an enlarged scale in FIG. 3. Wheel 7 is toothed, and its teeth interrupt a beam of light emitted by a small lamp 12, this beam being received by a photo-resistant cell or a photo-transistor 13 which delivers a pulsed DC signal with a frequency representing the speed of rotation of wheel 7 and hence the speed of passage of tape 5 past heads 8, 9 and 10. Alternatively, the tachometer wheel 7 could be a multi-pole magnetic wheel acting on a magnetic receiving head.

This pulsed DC signal is transmitted after amplification, shaping and integration to a control circuit which compares the integrated signal with that from an internal DC reference, developed across a potentiometer, and emits a control signal which is fed to a differential amplifier circuit which feeds the DC motors 1 and 2. A block diagram of the electronic circuit is given in FIG. 2. The pulsed direct current signal emitted by cell 13 is first amplified by an amplifier 14, shaped by a shaper 15 and then integrated by an integrator 16 to provide a DC voltage signal proportional to the speed of wheel 7. The integrated voltage is then compared with an internal DC reference voltage provided by a schematically shown potentiometer 17. These two voltages are compared in a differential amplifier circuit 18 which, when there is a voltage difference, provides control signals dependent on the sign and magnitude of said voltage difference and which increase or decrease the voltages supplied to the respective motors 1 and 2 in such a manner that the speed of wheel 7 remains constant. The motor currents depend upon the applied voltage difference and the impedance of the motors.

The tape 5 can thus be driven in either direction at constant speed, as had just been described. In addition, tape 5 can be driven at a high speed, i.e. for fast winding and re-winding. Fast winding and rewinding is controlled by supplying a suitable DC voltage directly to input 30 or 31 of the circuit to drive the appropriate take-up motor and spool at a high speed, the other motor and its spool being free to be rotated by the traction exerted by tape 5. Orders controlling the functions 'stop' and constant speed drive are treated in a direction control circuit 41 and delay store 42 (FIG. 6) before being applied to an input 32 or to an input 43 of amplifier 18 respectively.

Figure 4:
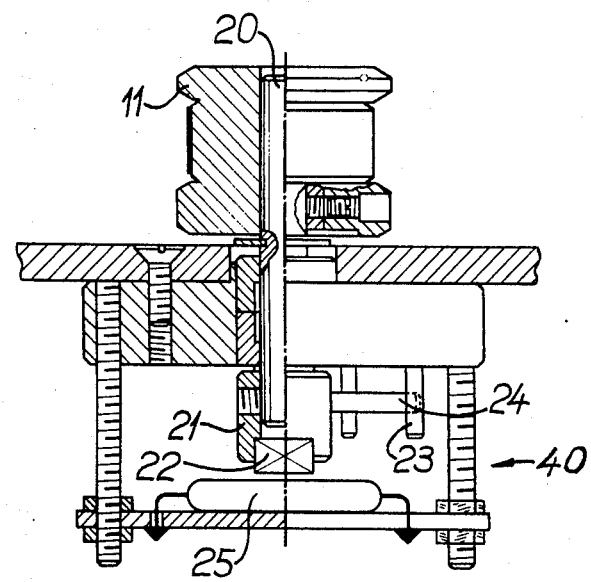
FIG. 4 is a side elevational view, partly in cross-section, of another detail.
Figure 5:
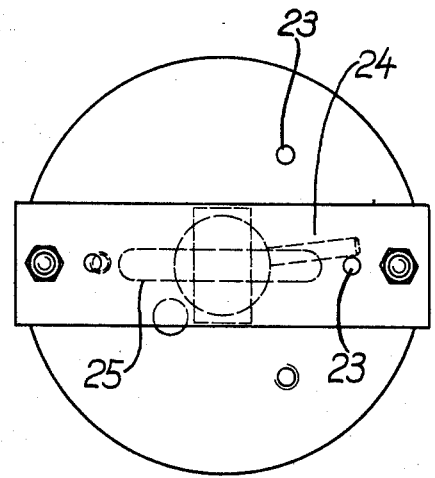
FIG. 5 is a bottom plan view of the detail shown in FIG. 4.

A direction control device 40, shown in detail in FIGS. 4 and 5, supplies a signal indicating the direction of travel of tape 5 to both circuit 41 and store 42. Device 40 includes roller 11 which is secured by means of a screw onto a shaft 20. Roller 11 has a smooth outer surface which engages with and is frictionally driven by tape 5 in the absence of a resistance to rotation of the roller. A piece 21 carrying a magnet 22 and a radially protruding arm 24 is screwed on the lower end of shaft 20. The rotation of arm 24, and consequently of shaft 20 and the main body of roller 11, is limited between two stops 23 to about 45°. When tape 5 is driven in one direction, the roller 11, shaft 20 and arm 24 are driven in the same direction until the arm 24 is stopped by one stop 23, and when the tape 5 is driven in the opposite direction, the arm 24 is brought into contact with the other stop 23. The magnet 22 cooperates with a reed contact 25 to open this contact when arm 24 is against one stop 23, and close it when arm 24 is against the other stop 23. Reed contact 25 thus supplies a binary logical (0 or 1) signal representing the direction of travel of tape 5.

Figure 2:
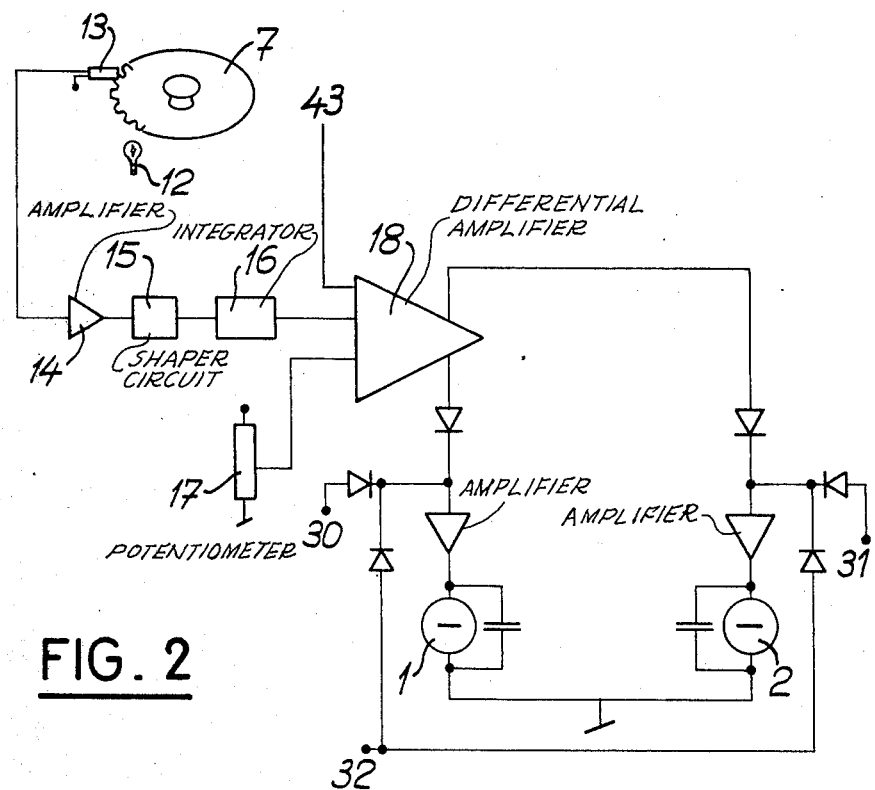
FIG. 2 is a block circuit diagram of the electronic control circuit.
Figure 6:
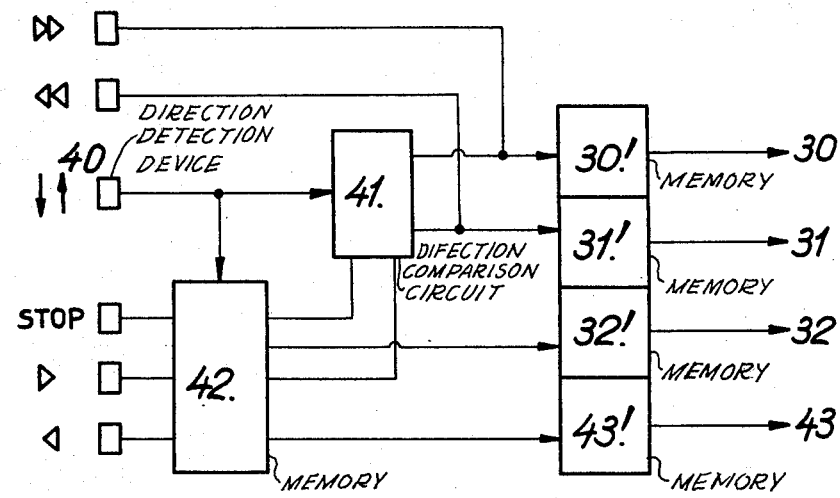
FIG. 6 is a block diagram of an optional part of the control circuit.

FIG. 6 schematically shows a circuit for connecting control buttons for the functions fast winding, fast rewinding, forward winding at constant speed, rewinding at constant speed and stop to the respective inputs of the circuit of FIG. 2. All of the control buttons are of a known type whereby any depressed button is released as soon as another button is pressed in. The buttons for fast winding and rewinding are connected to stores 30' and 31' respectively which control inputs 30 and 31. The constant speed winding and rewinding buttons are connected via the delay or reserve store 42 to a store 43' which is connected at 43 to control amplifier 18, the store 42 also acting on circuit 41. The stop button is connected via store 42 to both circuit 41 and store 32' whose output is connected to input 32. As mentioned above, device 40 simultaneously supplies a tape-direction signal to circuit 41 and store 42.

When either of the constant speed buttons is actuated to drive the tape in one direction, circuit 41 compares this direction with the direction indicated by device 40; if these directions are the same the order is transmitted by store 43' to input 43 of amplifier 18 by a signal the sign of which gives the desired direction. If a change of direction is involved, the order to be carried out is stored in store 42 and simultaneously a signal is given by circuit 41 to input 30 or 31 via store 30' or 31', to tend to rapidly rotate the motor of the tape outletting spool in the opposite direction, the motor of the tape receiving spool being freed. As soon as the tape 5 changes direction, the signal of device 40 changes, cutting off the rapid reverse (30 or 31) and triggering delivery of the order stored in store 42 to input 43 of amplifier 18(via store 43')which then controls drive of tape 5 at constant speed in the new direction.

When the stop button is actuated, the order is automatically stored in store 42, and circuit 41 supplies via store 30' or 31' a signal to input 30 or 31 tend to rapidly reverse the appropriate motor 1 or 2 until device 40 signals a change of direction of tape 5, whereupon the voltage supplied by input 30 or 31 in cut off and store 42 controls input 32 via store 32' to supply a low voltage to motors 1 and 2 tend to keep the tape 5 taut during a stop or pause.

What is claimed is:

1. A tape recorder comprising, two hubs for driving two tape spools to pass a tape from one spool to the other along a given path, two individual reversible motors for driving respective ones of said hubs, a tachometer wheel disposed so as to be driven by a tape passing along said given path at a speed proportional to the speed of the tape along said given path, means cooperative with said tachometer wheel for providing an electrical signal representing the speed of rotation of the tachometer wheel, direction-detecting means for detecting the direction of advance of the tape and for developing a tape direction signal representative of the direction of advance, and an electronic control circuit, said electronic control circuit including means for comparing said signal with a reference value and for providing to said motors control signals having current values dependent upon the voltage values thereof and the impedance of said motors, said voltage values being proportional to the difference value between said electrical signal and said reference value for differentially controlling the speeds of the two motors to maintain the speed of the tape along said given path at a constant value.

2. A tape recorder as claimed in claim 1, in which the direction-detecting means comprises a roller having a rolling surface adapted to be rotated by the tape, said roller being mounting to rotate with said tape in the absence of a resistance to rotation, stop means for limiting rotation of said roller between a first position and a second position, and means for providing a binary logical signal indicating whether said roller is in the first or second position.

3. A tape recorder according to claim 1, in which the electronic circuit includes means for storing order signals for controlling drive of the tape, means for comparing the order signals with a tape-direction signal from said direction-detecting means, and means for selectively supplying at least one motor reverse signal to rapidly reverse the tape direction until the detected tape direction changes.

4. A tape recorder according to claim 1, wherein said means for comparing and providing comprises: a differential amplifier receptive of said electrical signal and a reference signal and having a pair of outputs for developing an output signal thereat and proportional to the difference between said electrical signal and said reference signal; and a pair of diodes each connected to a respective one of said differential amplifier oututs and having the same relative polarities with respect to said outputs.

5. In a tape recorder of the type having a pair of tape-spool hubs, a pair of motors each for driving a respective one of said hubs, a tachometer wheel mounted for rotation and disposed along a tape advance path, and means cooperative with said tachometer wheel for developing an electrical signal representative of the speed of rotation of said tachometer wheel, the improvement which comprises: a control circuit comprised of a differential amplifier, receptive of said electrical signal and a reference signal, and having a pair of outputs for developing thereacross an output signal proportional to a difference between the electrical signal and the reference signal, each of said differential amplifier outputs being connected to a respective one of said motors for differentially controlling the speeds of the two motors to maintain constant the speed of a tape advanced between said hubs, and rotating said tachometer wheel; and a pair of diodes each connected to a respective one of said differential amplifier outputs and having the same polarities with respect to said outputs.

6. In a tape recorder of the type according to claim 5, wherein said pair of motors are reversible motors, and further comprising direction-detecting means for detecting the direction of advance of the tape and for developing a tape direction signal representative of the direction of advance, said direction-detecting means comprising a roller mounted for rotation and having a surface for making frictional contact with an advancing tape to rotate the roller, stop means for limiting rotation of said roller between a first position and a second position, and means for providing a binary logical signal indicating whether said roller is in the first or second position.

7. In a tape recorder of the type according to claim 5 wherein said control circuit includes means for storing order signals for controlling drive of the tape means for comparing the order signals with a tape-direction signal from said direction-detecting means, and means for selectively supplying at least one motor reverse signal to rapidly reverse the tape direction until the detected tape direction advances.

* * * * *